(12) United States Patent  
Annapureddy et al.

(10) Patent No.: US 9,131,345 B2
(45) Date of Patent: Sep. 8, 2015

(54) METHODS AND SYSTEMS FOR AUTOMATED INFORMATION ENTRY IN A WIRELESS DEVICE

(71) Applicant: QUALCOMM Incorporated, San Diego, CA (US)

(72) Inventors: Koushik Annapureddy, Tampere (FI); Keir Finlow-Bates, Kangasala (FI)

(73) Assignee: QUALCOMM INCORPORATED, San Diego, CA (US)

(*) Notice: Subject to any disclaimer, the term of this patent is extended or adjusted under 35 U.S.C. 154(b) by 107 days.

(21) Appl. No.: 13/802,723

(22) Filed: Mar. 14, 2013

(65) Prior Publication Data

US 2014/0274140 A1    Sep. 18, 2014

(51) Int. Cl.
| | |
|---|---|
| H04W 24/00 | (2009.01) |
| H04W 4/02 | (2009.01) |
| H04L 12/58 | (2006.01) |
| G06F 17/30 | (2006.01) |
| G06Q 10/10 | (2012.01) |
| H04M 1/725 | (2006.01) |

(Continued)

(52) U.S. Cl.
CPC ......... *H04W 4/026* (2013.01); *G06F 17/30241* (2013.01); *G06Q 10/107* (2013.01); *H04L 51/20* (2013.01); *H04M 1/72552* (2013.01); *H04M 1/72572* (2013.01); *H04W 4/02* (2013.01); *H04W 4/12* (2013.01); *H04W 4/185* (2013.01); *H04L 67/2804* (2013.01); *H04M 2250/70* (2013.01)

(58) Field of Classification Search
CPC ..... H04W 64/006; H04W 64/00; H04W 4/02; H04W 4/021; H04W 4/025; H04W 4/027; H04W 4/028

USPC ........... 455/456.1, 456.2, 456.3, 414.2, 414.3
See application file for complete search history.

(56) References Cited

U.S. PATENT DOCUMENTS

| 7,774,003 B1 | 8/2010 | Ortega et al. |
| 7,966,306 B2 | 6/2011 | Strandell et al. |

(Continued)

FOREIGN PATENT DOCUMENTS

| WO | 2009083719 A1 | 7/2009 |
| WO | 2009126231 A1 | 10/2009 |

OTHER PUBLICATIONS

International Search Report and Written Opinion—PCT/US2014/023587—ISA/EPO—Sep. 8, 2014.

(Continued)

*Primary Examiner* — Khai M Nguyen
(74) *Attorney, Agent, or Firm* — Muncy, Geissler, Olds & Lowe, P.C.

(57) ABSTRACT

Methods and apparatus for automated information entry in a wireless device may include receiving an input of a sequence of characters. In addition, the methods and apparatus may include identifying a location-related context based on at least a portion of the sequence of characters and obtaining location information of the wireless device in response to identifying the location-related context. The methods and apparatus may also include obtaining a set of one or more landmark information corresponding to the location information of the wireless device and obtaining directional information relative to selected landmark information. The method and apparatus may also include adding the directional information with the selected landmark information to the sequence of characters.

50 Claims, 16 Drawing Sheets

(51) Int. Cl.
*H04W 4/12* (2009.01)
*H04W 4/18* (2009.01)
*H04L 29/08* (2006.01)

(56) References Cited

U.S. PATENT DOCUMENTS

| | | | |
|---|---|---|---|
| 8,078,978 B2 | 12/2011 | Perry et al. | |
| 8,135,735 B2 | 3/2012 | Johnson et al. | |
| 8,301,371 B2* | 10/2012 | Sheha et al. | 701/426 |
| 2009/0070293 A1 | 3/2009 | Vechersky | |
| 2010/0120401 A1 | 5/2010 | Mears | |
| 2010/0241714 A1 | 9/2010 | Aono et al. | |
| 2010/0255865 A1 | 10/2010 | Karmarkar | |
| 2012/0083285 A1* | 4/2012 | Shatsky et al. | 455/456.1 |
| 2012/0254263 A1* | 10/2012 | Hiestermann et al. | 707/812 |
| 2013/0060351 A1 | 3/2013 | Imming et al. | |
| 2013/0253831 A1* | 9/2013 | Langendorff | 701/533 |
| 2014/0063058 A1* | 3/2014 | Fialho et al. | 345/633 |

OTHER PUBLICATIONS

Partial International Search Report—PCT/US2014/023587—ISA/EPO—Jul. 17, 2014.

* cited by examiner

METHODS AND SYSTEMS FOR AUTOMATED INFORMATION ENTRY IN A WIRELESS DEVICE

BACKGROUND

With the proliferation of wireless devices that have increased power, memory, and other features, more and more wireless devices are being used for sending messages, such as text messages, e-mail messages, SMS messages, etc. to other individuals. When sending messages to other individuals, users of wireless devices may want to include location information in the messages so that other individuals may locate the users. In addition, if the message the user is composing relates to the current location of the user, the user may want to include the location to support the context of the message. However, if a user is in a new location, or unsure of the user's exact location, the user may not be able to include location information in the message. In addition, methods currently used for including location information in messages may not provide an exact location of the user.

Thus, it would be desirable to include the location information into messages being composed on wireless devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of automated information entry in a wireless device. The method may include receiving, at a user interface of the wireless device, an input of a sequence of characters. The method may also include identifying a location-related context based on at least a portion of the sequence of characters. In addition, the method may include obtaining location information of the wireless device in response to identifying the location-related context. The method may also include obtaining a set of one or more landmark information corresponding to the location information of the wireless device. The method may further include receiving selected landmark information from the set of one or more landmark information. Moreover, the method may include obtaining directional information relative to the selected landmark information, wherein the directional information includes one or more of a direction and a distance of the wireless device from the selected landmark information. The method may also include adding the directional information with the selected landmark information to the sequence of characters.

Another aspect relates to at least one processor configured for automated information entry in a wireless device. The processor may include a first module for receiving, at a user interface of the wireless device, an input of a sequence of characters. The processor may also include a second module for identifying a location-related context based on at least a portion of the sequence of characters. The processor may also include a third module for obtaining location information of the wireless device in response to identifying the location-related context. The processor may also include a fourth module for obtaining a set of one or more landmark information corresponding to the location information of the wireless device. The processor may also include a fifth module for receiving selected landmark information from the set of one or more landmark information. The processor may also include a sixth module for obtaining directional information relative to the selected landmark information. The directional information can include one or more of a direction and a distance of the wireless device from the selected landmark information. The processor may also include a seventh module for adding the directional information with the selected landmark information to the sequence of characters.

Another aspect relates to a computer program product. The computer program product may include a computer-readable medium including at least one instruction for causing a computer to receive, at a user interface of a wireless device, an input of a sequence of characters. The computer-readable medium may also include at least one instruction for causing the computer to identify a location-related context based on at least a portion of the sequence of characters. The computer-readable medium may also include at least one instruction for causing the computer to obtain location information of the wireless device in response to identifying the location-related context. In addition, the computer-readable medium may include at least one instruction for causing the computer to obtain a set of one or more landmark information corresponding to the location information of the wireless device. The computer-readable medium may include at least one instruction for causing the computer to receive selected landmark information from the set of one or more landmark information. The computer-readable medium may include at least one instruction for causing the computer to obtain directional information relative to the selected landmark information, wherein the directional information includes one or more of a direction and a distance of the wireless device from the selected landmark information. The computer-readable medium may include at least one instruction for causing the computer to add the directional information with the selected landmark information to the sequence of characters.

Another aspect relates to an apparatus. The apparatus may include means for receiving, at a user interface of a wireless device, an input of a sequence of characters. The apparatus may also include means for identifying a location-related context based on at least a portion of the sequence of characters. In addition, the apparatus may include means for obtaining location information of the wireless device in response to identifying the location-related context. The apparatus may also include means for obtaining a set of one or more landmark information corresponding to the location information of the wireless device. The apparatus may further include means for receiving selected landmark information from the set of one or more landmark information. Moreover, the apparatus may include means for obtaining directional information relative to the selected landmark information. The directional information can include one or more of a direction and a distance of the wireless device from the selected landmark information. The apparatus may also include means for adding the directional information with the selected landmark information to the sequence of characters.

Yet another aspect relates to an apparatus. The apparatus may include an input component operable to receive, at a user interface of a wireless device, an input of a sequence of characters. The apparatus may also include a location-related component operable to identify a location-related context based on at least a portion of the sequence of characters. The apparatus may also include a location component operable to obtain location information of the wireless device in response to identifying the location-related context. The apparatus may also include a receiving component operable to obtain a set of one or more landmark information corresponding to the location information of the wireless device. The apparatus may also include a selection component operable to receive selected landmark information from the set of one or more landmark information. The apparatus may also include the receiving component being further operable to obtain directional information relative to the selected landmark information. The directional information can include one or more of a direction and a distance of the wireless device from the selected landmark information. The apparatus may also include a presenting component operable to add the directional information with the selected landmark information to the sequence of characters.

Another aspect relates to a method of transmitting location information. The method may include receiving a location of a wireless device. The method may also include obtaining a first set of landmark information within a first range from the location of the wireless device. In addition, the method may include determining whether a number of landmark information included in the first set of landmark information meets a search result threshold. The method may also include transmitting the first set of landmark information to the wireless device when the first set of landmark information meets the search result threshold.

Another aspect relates to at least one processor configured for transmitting location information. The processor may include a first module for receiving a location of a wireless device. The processor may also include a second module for obtaining a first set of landmark information within a first range from the location of the wireless device. The processor may further include a third module for determining whether a number of landmark information included in the first set of landmark information meets a search result threshold. The processor may also include a fourth module for transmitting the first set of landmark information to the wireless device when the first set of landmark information meets the search result threshold.

Yet another aspect relates to a computer program product. The computer program product may include a computer-readable medium including at least one instruction for causing a computer to receive a location of a wireless device. The computer-readable medium may also include at least one instruction for causing the computer to obtain a first set of landmark information within a first range from the location of the wireless device. The computer-readable medium may also include at least one instruction for causing the computer to determine whether a number of landmark information included in the first set of landmark information meets a search result threshold. The computer-readable medium may also include at least one instruction for causing the computer to transmit the first set of landmark information to the wireless device when the first set of landmark information meets the search result threshold.

Another aspect relates to an apparatus. The apparatus may include means for receiving a location of a wireless device. The apparatus may also include means for obtaining a first set of landmark information within a first range from the location of the wireless device. The apparatus may also include means for determining whether a number of landmark information included in the first set of landmark information meets a search result threshold. The apparatus may also include means for transmitting the first set of landmark information to the wireless device when the first set of landmark information meets the search result threshold.

Another aspect relates to an apparatus for transmitting location information. The apparatus may include a receiving component operable to receive a location of a wireless device. The apparatus may also include a landmark obtaining component operable to obtain a first set of landmark information within a first range from the location of the wireless device and determine whether a number of landmark information included in the first set of landmark information meets a search result threshold. The apparatus may also include a sending component operable to transmit the first set of landmark information to the wireless device when the first set of landmark information meets the search result threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for providing automated information entry in a wireless device based upon a current location of the wireless device. The described aspects may obtain landmark information for one or more landmarks near the current location of the wireless device, for example, from a map database or other data repository, and may present a list of one or more landmarks to a user of the wireless device. The user may select one of the landmarks and the wireless device may automatically enter the obtained landmark information into a message (e.g., text message, e-mail message, SMS message, or other text boxes) being composed on the wireless device.

In addition, the described aspects may obtain directional information of the wireless device relative to the selected landmark. The directional information may indicate the location of the wireless device relative to the selected landmark. For example, the directional information may indicate that the wireless device is 15 meters south of the landmark. The directional information may be included in the message with the selected landmark information. The described aspects may also obtain one or more images representative of the landmark information and include the obtained one or more images in the message with the landmark information and/or the directional information.

Figure 1:
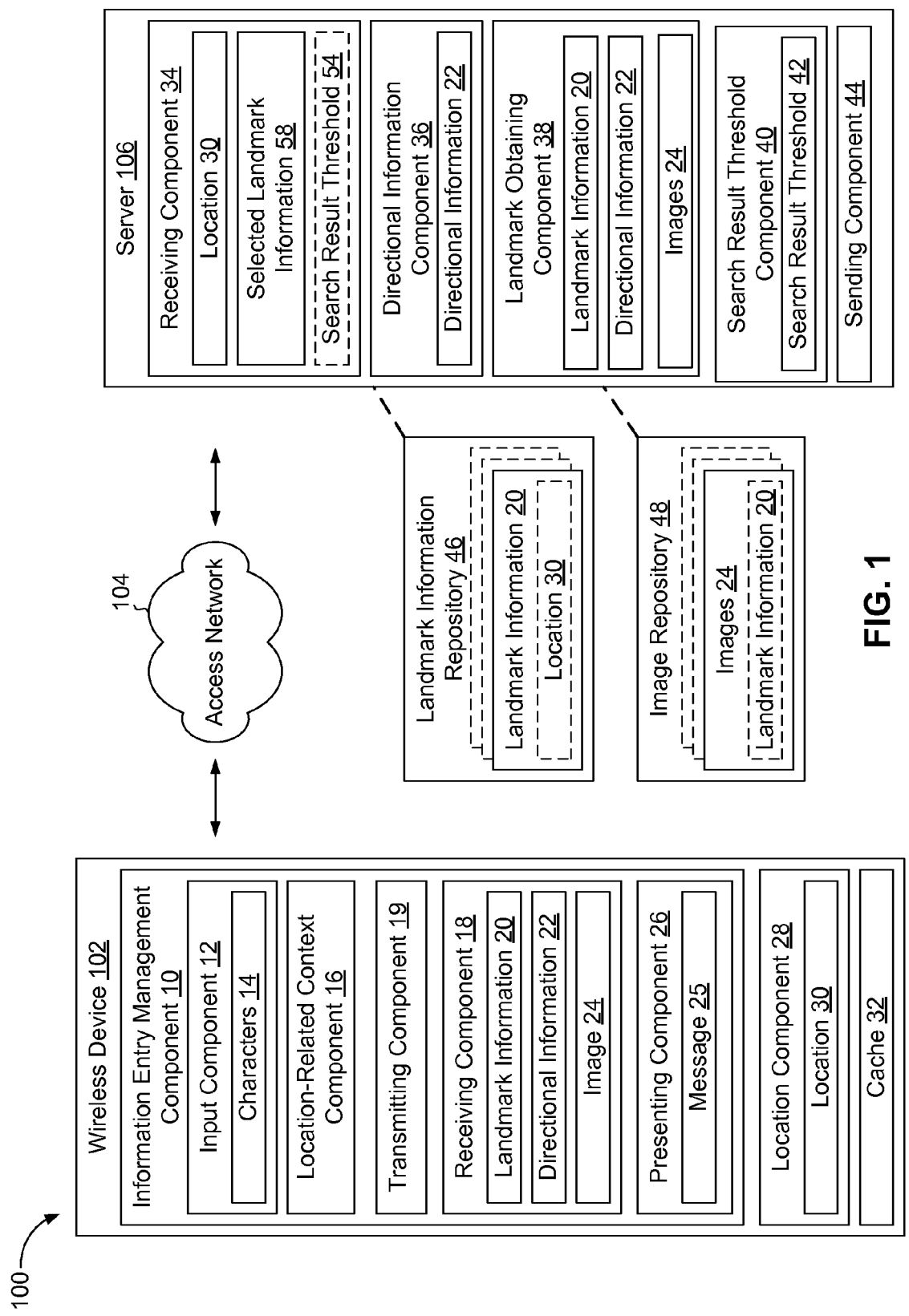
FIG. 1 is an illustration of an example connectivity system in accordance with an aspect.
Figure 2:
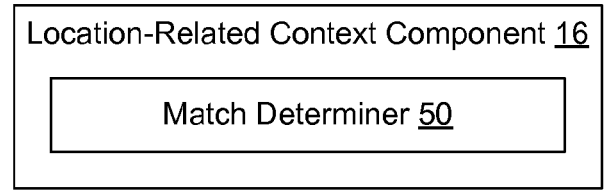
FIG. 2 is an illustration of an example information entry management component in accordance with an aspect.
Figure 2:
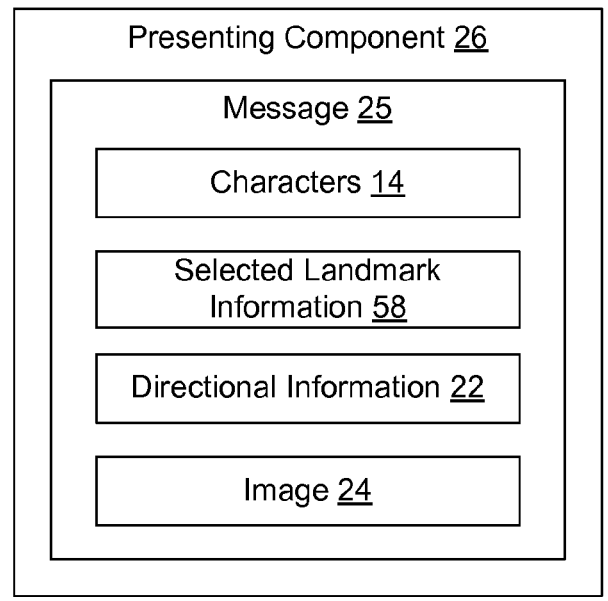
Figure 2:
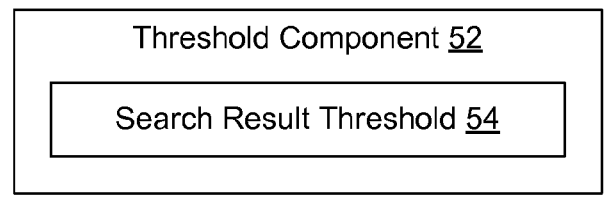
Figure 2:
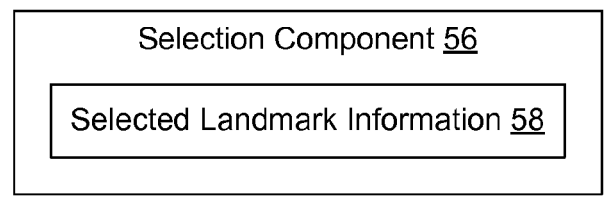

Referring now to FIGS. 1 and 2, illustrated is an example system 100 for automated information entry in accordance with an aspect. System 100 may include one or more wireless devices 102 communicating via an access network with one or more servers 106.

Wireless device 102 may include any mobile, portable computing or communications device, such as a cellular device, that may connect to an access network 104. Wireless device 102 may be, for example, a cellular telephone, a navigation system, a computing device, a camera, a personal digital assistant (PDA), a music device, a gaming device or a handheld device having wireless connection capability, among other devices. Server/computing device 106 may include any mobile or fixed computing device connected to a network.

In addition, access network 104 may provide one or more types of communication connections, such as any type of wired or wireless airlink, to wireless device 102 and server 106. Wireless device 102 may place and/or receive a call, e.g., a voice call, a data call, a conference call, a video conferencing call, an Internet Protocol session, a Voice Over Internet protocol (IP) call, a short message service (SMS) message, a multimedia messaging service (MMS) message, an instant messaging (IM) service message, a chat or net-meeting related connection, a video, music, or data transfer, among other communications, via access network 104 to and/or from one or more servers 106. In addition, wireless device 102 may receive a call via access network 104 from one or more servers 106, or from any other device in communication with access network 104.

Wireless device 102 may include an information entry management component 10 operable to manage information entry on wireless device 102. Information entry management component 10 may include an input component 12 operable to receive a sequence of characters 14, e.g., which may be input by a user of wireless device 102. For example, the sequence of characters 14 may be a message (e.g., text message, e-mail, SMS message, or other text boxes) being composed on wireless device 102. In an aspect, the sequence of characters 14 may indicate a location-related context of wireless device 102. For example, the sequence of characters 14 may include location-inferring word(s), such as, but not limited to, "in", "at", "on", "visiting", "heading", "going", "by", "near", "from", "next to", "in front of", "beside", "beneath", and "on top of", among other words that may infer a location and/or traveling towards a location.

Information entry management component 10 may also include a location-related context component 16 operable to identify the location-related context of wireless device 102 based on at least a portion of the sequence of characters 14. For example, location-related context component 16 may interface with input component 12, and upon receiving one or more of the location inferring word(s) from input component 12, location-related context component 16 may identify the location-related context of wireless device 102.

In an aspect, location-related context component 16 may include a match determiner 50 (FIG. 2) operable to detect a match between a location-inferring word and at least the portion of the sequence of characters 14. Thus, upon match determiner 50 detecting a match between a location-inferring word and at least a portion of the sequence of characters 14, location-related context component 16 may identify the location-related context of wireless device 102.

Another example may include a user of wireless device 102 selecting a "location button" on wireless device 102 to indicate the location-related context. The location button may allow a user to obtain a current location 30 of wireless device 102 by pressing the location button. Therefore, instead of the location-related context component 16 inferring a location-related context from a sequence of characters 14, the user may select a location button on wireless device 102 to obtain the location-related context.

The location button and/or the location-related context component 16 may interface with location component 28. Location component 28 may obtain the current location 30 of wireless device 102 after the location-related context component 16 identifies the location-related context and/or a user of wireless device 102 selects the location button. In an aspect, location component 28 may use a terrestrial and/or satellite-based positioning system, such as but not limited to a global positioning system (GPS) component to obtain the current location 30 of wireless device 102. In another aspect, location component 28 may use the last fix (e.g., the last known location) of the positioning system on the wireless device 102 to obtain the current location 30 of wireless device 102. For example, if a component on wireless device 102, such as an accelerometer indicates that the location of wireless device 102 has not changed significantly since the last fix, location component 28 may use the last fix to obtain the current location 30 of wireless device 102.

Information entry management component 10 may also include a transmitting component 19 operable to transmit the current location 30 of wireless device 102 to server 106. For example, transmitting component 19 may transmit the obtained location 30 via access network 104 to server 106.

Server 106 may include a receiving component 34 operable to receive the location 30 transmitted from wireless device 102. Receiving component 34 may interface with a landmark obtaining component 38 operable to obtain landmark information 20 from one or more landmark information repositories 46. Landmark information 20 may include, but is not limited to, a name of a landmark or a structure or a building, a street name, an address, an intersection name, a graphic and/or icon depicting or representing the location, etc. In an aspect, landmark information repository 46 may include landmark information 20, where each landmark information 20 may correspond to a location 30. For example, landmark information repository 46 may be a map data repository.

In an aspect, landmark obtaining component 38 may determine whether the number of retrieved landmarks included in the initially retrieved set of landmark information 20 meets a search result threshold 42 (e.g., 1 result, 3 results, etc. . . . ). For example, initially, the obtained set of one or more landmark information 20 may be within a first range from the location 30 of wireless device 102. Landmark obtaining component 38 may interface with a search result threshold component 40 operable to generate a search result threshold 42 to determine whether the retrieved set of landmark information 20 meets the search result threshold 42. In an aspect, the search result threshold 42 may be a set number, e.g., one or more, the first x results, etc., or some number calculated by search result threshold component 40 using rules and/or algorithms, e.g., based on a display capability of wireless device 102, based on how crowded an area is with landmark information, etc. In addition, the search result threshold 42 may optionally be received from wireless device 102. For example, a user of wireless device 102 may input the search result threshold 42 (e.g., at least 4 results should be included). In another example, a user of wireless device 102 may request additional search results. Landmark obtaining component 38 may retrieve additional landmarks within a second range of the location 30 of wireless device 102 upon determining that the number of landmark information included in the initially retrieved landmark information 20 does not meet the search result threshold 42 (e.g., returned no results and/or a limited number of results). It should be noted that the first range may be smaller than the second range. As such, the landmark obtaining component 38 may initially search within a close range to the location 30 for landmarks, and if, the landmark obtaining component 38 does not retrieve a landmark and/or does not retrieve a number of landmarks that meets search result threshold 42, then the landmark obtaining component 38 may extend the range of the search until the landmark obtaining component 38 retrieves a number of landmarks that meets search result threshold 42.

In addition, landmark obtaining component 38 may be operable to obtain images 24 from one or more image repositories 48. For example, images 24 may correspond to the landmark information 20. In aspect, for example, images 24 may include, but are not limited to, a graphic and/or an icon depicting or representing the location.

Landmark obtaining component 38 may interface with sending component 44 operable to transmit to wireless device 102 the obtained set of landmark information 20 and/or images 24. For example, sending component 44 may send the obtained landmark information 20 to receiving component 18 on wireless device 102. As such, wireless device 102 may obtain a set of one or more landmark information 20 corresponding to the location 30 of wireless device 102 from server 106. It should be noted that the obtained set of one or more landmark information 20 may be ordered in a list (e.g., relative to distance from the wireless device, alphabetically, etc.).

In an aspect, receiving component 18 may interface with a threshold component 52 (FIG. 2) to determine whether the received set of landmark information 20 meets a search result threshold 54 (FIG. 2). The search result threshold 54 may indicate whether the number of retrieved landmark information 20 meets a minimum threshold (e.g., 1 result, 3 results, etc. . . . ). In an aspect, threshold component 52 may receive the search result threshold 54 from a user of wireless device 102. For example, the user may input a search result threshold 54 of 4 results. Wireless device 102 may obtain additional landmark information 20 within a second range of the location 30 upon determining that the number of landmark information 20 included in the initially retrieved landmark information 20 does not meet the search result threshold 54 (e.g., returned no results and/or a limited number of results). For example, wireless device 102 may request additional search results from server 106 upon determining that the initially retrieved landmark information 20 does not meet the search result threshold 54.

Information entry management component 10 may further include a selection component 56 (FIG. 2) operable to receive selected landmark information 58 (FIG. 2) from the set of obtained landmark information 20. For example, the user of wireless device 102 may select a landmark from the set of obtained landmark information 20.

In an aspect, transmitting component 19 may interface with selection component 56 and transmit the selected landmark information 58 to server 106. Receiving component 34 on server 106 may receive the transmitted selected landmark information 58 from wireless device 102 and may interface with directional information component 36. Directional information component 36 may obtain directional information 22 of wireless device 102 relative to the selected landmark information 58. Directional information 22 may include, but is not limited to, directional information (e.g., north, south, east, and west) and/or the distance (e.g., 50 m) of the wireless device from the landmark. In an aspect, directional information 22 may be calculated by using the following formula:

$$\text{heading} = a\tan 2(\sin(lon2-lon1)*\cos(lat2), \cos(lat1)*\sin(lat2)-\sin(lat1)*\cos(lat2)*\cos(lon2-lon1))$$

where lat1, lon1 indicate the latitude and longitude location of wireless device 102, lat2, lon2 indicate the latitude and longitude location of the selected landmark information 58, and a tan 2 is a programming function related to the mathematical function arctan. The result of formula (1) may include a bearing in radians, which may be converted to degrees by multiplying the result by 180/π. The resulting values may range between negative 180 degrees and 180 degrees. For any negative values, 360 may be added to the negative values to get a standard compass bearing.

Sending component 44 may transmit the obtained directional information 22 to wireless device 102. Receiving component 18 may receive the directional information 22 for the selected landmark information 58 from server 106. Receiving component 18 may interface with presenting component 26 operable to present a message 25 on wireless device 102.

Referring to FIG. 2, the message 25 presented by presenting component 26 may include the sequence of characters 14. Presenting component 26 may add at least the selected landmark information 58 from the set of one or more landmark information 20 to the sequence of characters 14. For example, the user of the wireless device may select landmark information 58 from the set of obtained landmark information 20 and presenting component 26 may complete message 25 (e.g., SMS message, e-mail, or other text entry) with the selected landmark information 58.

Presenting component 26 may also add directional information 22 of wireless device 102 relative to the selected landmark information 58 to the sequence of characters 14. For example, if wireless device 102 was 10 meters north of the selected landmark information 58, presenting component 26 may complete the message 25 with the directional information 22 (e.g., 10 m north) of wireless device 102 relative to the selected landmark information 58. In addition, presenting component 26 may also add an image 24 of the selected landmark information 58 to message 25. Thus, message 25 may include the sequence of characters 14, the selected landmark information 58, directional information 22, and an image 24 of the selected landmark information 58.

Referring back to FIG. 1, wireless device 102 may also include a cache 32 operable to store the obtained landmark information 20.

Figure 3:
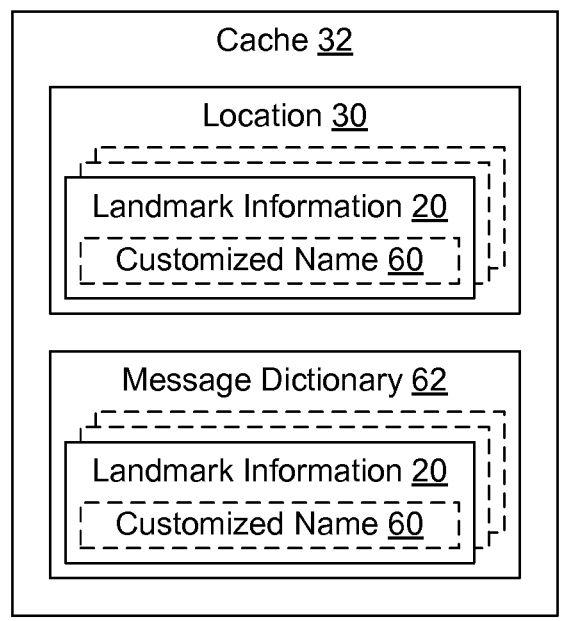
FIG. 3 is an illustration of an example cache in accordance with an aspect.

Referring to FIG. 3, for example, cache 32 may store the obtained landmark information 20 associated with a location 30 so that wireless device 102 may obtain the landmark information 20 from the cache 32 when wireless device 102 returns to location 30 in the future without having to query server 106 to get the landmark information 20. In addition, a user may provide customized names 60 for a landmark (e.g., "home", "work", "school", etc.) and may store the customized names 60 in the cache 32. As such, wireless device 102 may present the customized name 60 of the landmark to the user for selection and entry into the message. The landmark information 20 from cache 32 may also be added to a message dictionary 62 so that the landmark information 20 may automatically display when a user is typing a message in the location 30 as an option for addition to the message.

Figure 4:
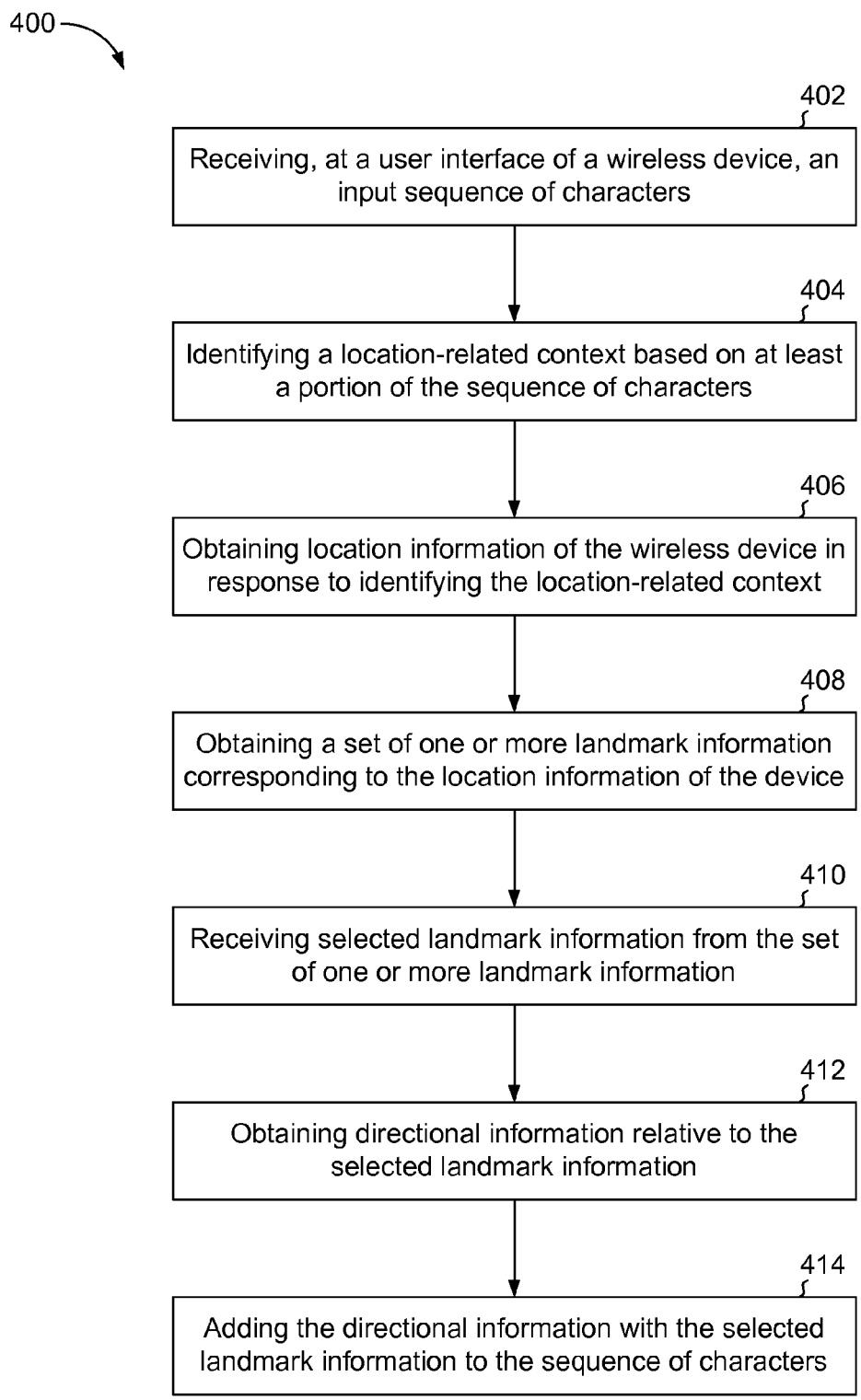
FIG. 4 is a flow chart illustrating a method for automated information entry in accordance with an aspect.

Referring now to FIG. 4, a method 400 for automated information entry in accordance with an aspect includes, at 402, receiving, at a user interface of a wireless device, an input sequence of characters. The input sequence of characters may include a message, such as a text message, an e-mail message, an SMS message, etc. being composed on the wireless device. For example, an input component 12 (FIG. 1) on wireless device 102 (FIG. 1) may receive an input sequence of characters.

The method may also include, at 404, identifying a location-related context based on at least a portion of the sequence of characters. The portion of the sequence of characters may include location-inferring word(s), such as, but not limited to, "in", "at", "on", "visiting", "heading", "going", "by", "near", "from", "next to", "in front of", "beside", "beneath", and "on top of", among other words that may infer a location and/or traveling towards a location. In an aspect, a location-related context component 16 (FIG. 1) may identify a location-related context of wireless device 102 based on at least a portion of the sequence of characters. For example, the location-related context component 16 may identify a match between a location-inferring word and at least the portion of the sequence of characters. In another aspect, the location-related context component 16 may identify a location-related context of wireless device 102 when a user of wireless device 102 selects a location button on wireless device 102 to indicate the location-related context.

At 406, the method may include obtaining location information of the wireless device in response to identifying the location-related context. The location information of the wireless device may be obtained, for example, by using a global positioning system (GPS) component on the wireless device to obtain the current location of the wireless device. In addition, the location information may be obtained by using the last fix of the wireless device. For example, if a component on the wireless device, such as an accelerometer indicates that the location of the wireless device has not changed significantly since the last fix, the location information may be obtained by using the last fix of the wireless device. In an aspect, a location component 28 (FIG. 1) on wireless device 102 may obtain the location information of wireless device 102.

The method may further include, at 408, obtaining a set of one or more landmark information corresponding to the location information of the wireless device. Landmark information may include, but is not limited to, a name of landmark, a structure, a building, a street name, an address, an intersection, a graphic and/or icon depicting or representing the location, etc. For example, a receiving component 18 (FIG. 1) on wireless device 102 may obtain a set of one or more landmark information corresponding to the location of wireless device 102.

In addition, the method may include, at 410, receiving selected landmark information from the set of one or more landmark information. For example, the user of the wireless device may select a landmark from the set of obtained landmark information. In an aspect, selection component 56 (FIG. 2) may receive the selected landmark information from the user.

Moreover, the method may include, at 412, obtaining directional information relative to the selected landmark information. Directional information may include, but is not limited to, directional information (e.g., north, south, east, and west) and/or the distance (e.g., 50 m) of the wireless device from the landmark. For example, if the user selected a city park from the set of obtained landmark information and the wireless device was 25 meters north of the city park, the directional information of the wireless device may include "25 meters north" of the city park. In an aspect, receiving component 18 may receive the directional information of wireless device relative to the selected landmark.

The method may also include, at 414, adding the directional information with the selected landmark information to the sequence of characters. For example, presenting component 26 (FIG. 1) may complete a message on wireless device 102 with the directional information of wireless device 102 relative to the selected landmark information.

Figure 5:
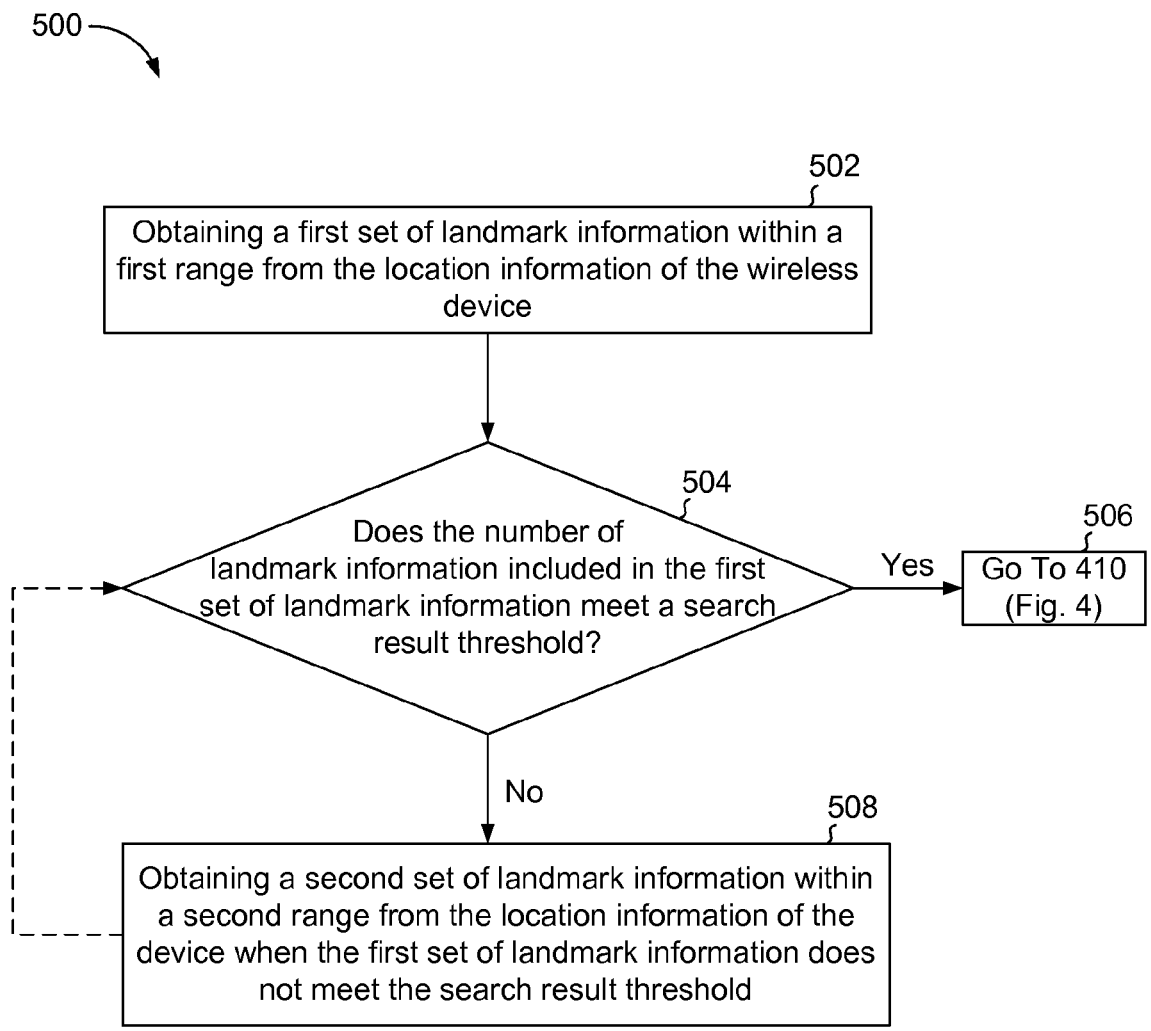
FIG. 5 is a flow chart illustrating a method for obtaining landmark information in accordance with an aspect.

Referring now to FIG. 5, a method 500 for obtaining landmark information in accordance with an aspect includes, at 502, obtaining a first set of landmark information within a first range from the location information of the wireless device. For example, receiving component 18 (FIG. 1) on wireless device 102 (FIG. 1) may obtain a first set of landmark information within a first range from the location of wireless device 102.

The method may also include, at 504, determining whether the number of landmark information included in the first set of landmark information meets a search result threshold. The search result threshold may indicate whether the number of retrieved landmark information meets a minimum threshold level (e.g., 1 result, 3 results, etc. . . . ). In an aspect, receiving component 18 (FIG. 1) may determine whether the number of landmark information included in the first set of landmark information meets a search result threshold.

When the number of landmark information included in the first set of landmark information meets a search result threshold, the method, at 506, may proceed to 410 (FIG. 4). For example, when the receiving component 18 determines that the first set of landmark information meets a search result threshold (e.g., the number of landmark information is equal to or greater than the search result threshold), the receiving component 18 may not obtain additional landmark information.

The method may further include, at 508, obtaining a second set of landmark information within a second range from the location information of the wireless device when the first set of landmark information does not meet the search result threshold. For example, when the receiving component 18 determines that the first set of landmark information does not meet a search result threshold (e.g., returned no results and/or a limited number of results), receiving component 18 may obtain additional landmark information within a second range of the location of the wireless device. It should be noted that the first range may be smaller than the second range.

Figure 6:
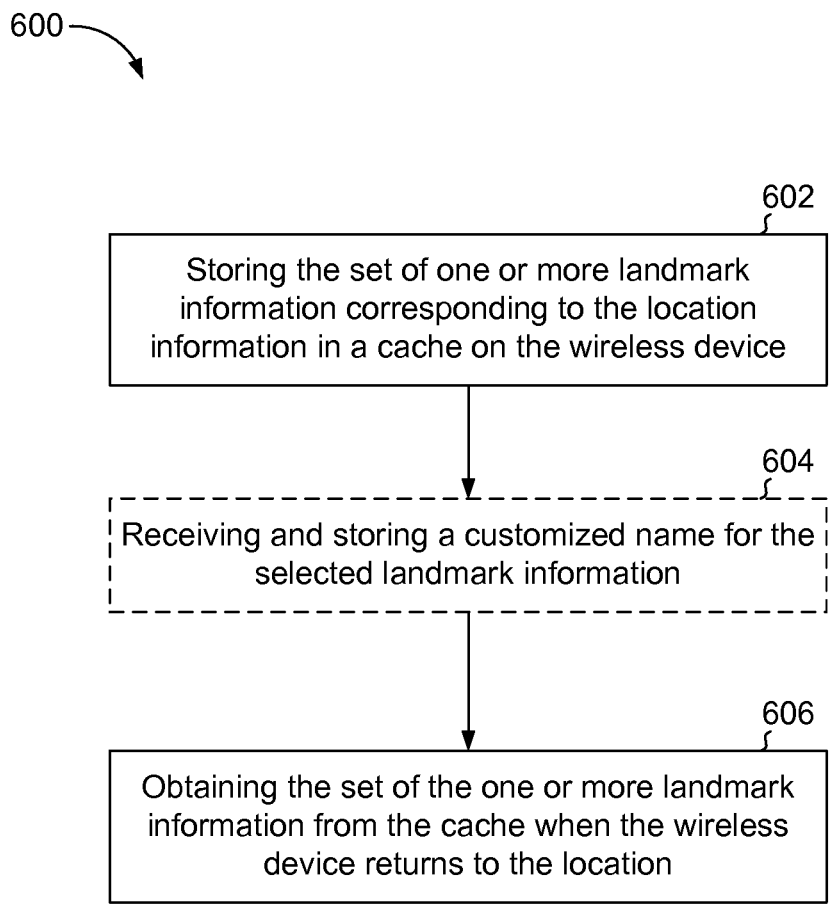
FIG. 6 is a flow chart illustrating a method for using the cache in accordance with an aspect.

Referring now to FIG. 6, a method 600 for using a cache in accordance with an aspect includes, at 602, storing the set of one or more landmark information corresponding to the location information in a cache on the wireless device. For example, cache 32 (FIG. 1) on wireless device 102 (FIG. 1) may store the obtained landmark information associated with a location.

The method may optionally include, at 604, receiving and storing a customized name for the selected landmark information. Customized names may include, but are not limited to, "home", "work", "school", "gym", etc. In an aspect, cache 32 may receive and store the customized names associated with the appropriate landmark information. As such, the wireless device may present the customized name of the landmark information to the user for selection and entry into a message.

In addition, at 606, the method may include obtaining the set of the one or more landmark information from the cache when the wireless device returns to the location. In an aspect, wireless device 102 may obtain the landmark information from cache 32 when wireless device 102 returns to location in the future without having to query a server to get the landmark information. In another aspect, the landmark information from cache 32 may also be added to a message dictionary so that the landmark information may automatically display when a user is typing a message in the location as an option for addition to the message.

Figure 7:
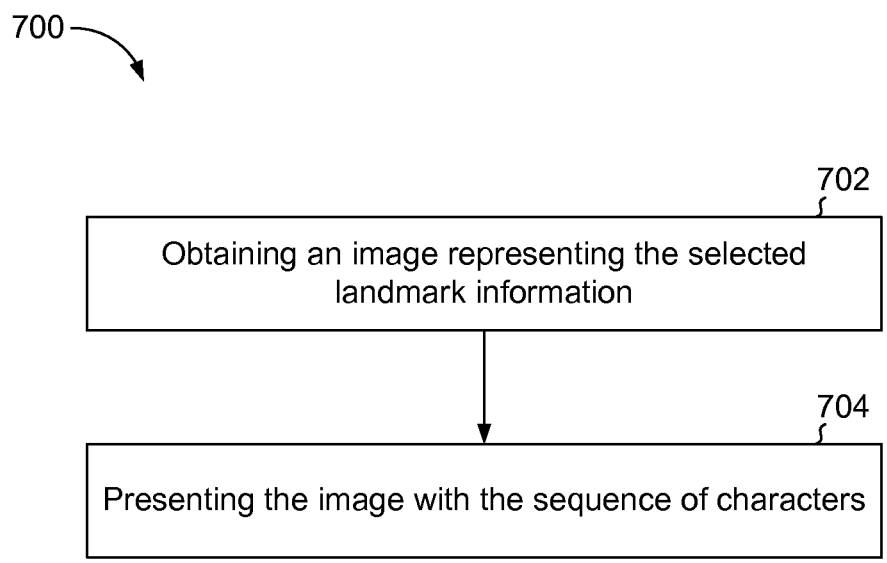
FIG. 7 is a flow chart illustrating a method for receiving images in accordance with an aspect.

Referring now to FIG. 7, a method 700 for receiving images in accordance with an aspect includes, at 702, obtaining an image representing the selected landmark information. For example, receiving component 18 (FIG. 1) may receive an image representing the selected landmark information from a server.

At 704, the method may also include presenting the image with the sequence of characters. In an aspect, presenting component 26 (FIG. 1) may add an image of the selected landmark information to a message, such as a text message, an e-mail message, a SMS message, etc. being composed on the wireless device.

Figure 8:
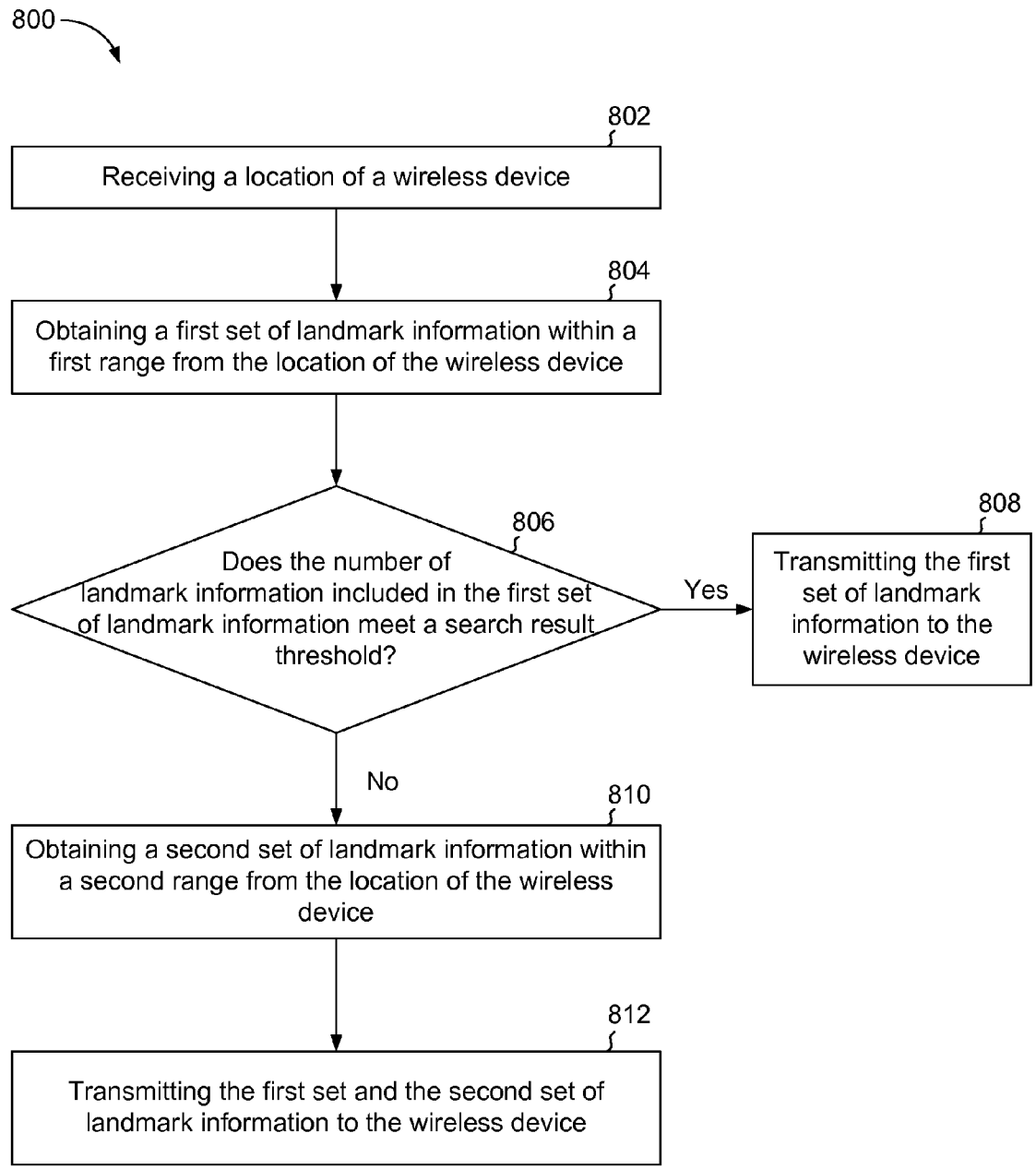
FIG. 8 is a flow chart illustrating a method for transmitting location information to a wireless device in accordance with an aspect.

Referring now to FIG. 8, a method 800 for transmitting location information in accordance with an aspect includes, at 802, receiving a location of a wireless device. For example, receiving component 34 (FIG. 1) may receive a location of wireless device 102 (FIG. 1).

The method may also include, at 804, obtaining a first set of landmark information within a first range from the location of the wireless device. Landmark information may be obtained, for example, from a plurality of landmark information repositories, such as a map data repository. In an aspect, landmark obtaining component 38 (FIG. 1) may determine whether the number of retrieved landmarks included in the initially retrieved set of landmark information meets a search result threshold (e.g., 1 result, 3 results, etc. . . . ).

At 806, the method may include determining whether the number of landmark information included in the first set of landmark information meets a search result threshold. For example, landmark obtaining component 38 may determine whether the number of landmark information included in the first set of landmark information meets a search result threshold.

When the first set of landmark information meets a search result threshold, the method may include, at 808, transmitting the first set of landmark information to the wireless device. For example, sending component 44 (FIG. 1) may transmit the first set of landmark information to wireless device 102.

At 810, the method may also include obtaining a second set of landmark information within a second range from the location of the wireless device when the first set of landmark information does not meet a search result threshold. In an aspect, landmark obtaining component 38 may retrieve additional landmarks within a second range of the location of wireless device 102 upon determining that the number of landmark information included in the initially retrieved landmark information does not meet the search result threshold (e.g., returned no results and/or a limited number of results). It should be noted that the first range may be smaller than the second range. As such, an initial search may occur within a close range to the location of the wireless device for landmarks, and if, the landmark obtaining component 38 does not retrieve a landmark and/or does not retrieve a required number of landmarks, the landmark obtaining component 38 may extend the range of the search until the landmark obtaining component 38 retrieves an appropriate number of landmarks.

The method may further include, at 812, transmitting the first set and the second set of landmark information to the wireless device. For example, sending component 44 may transmit the first and second sets of landmark information to wireless device 102.

Figure 9:
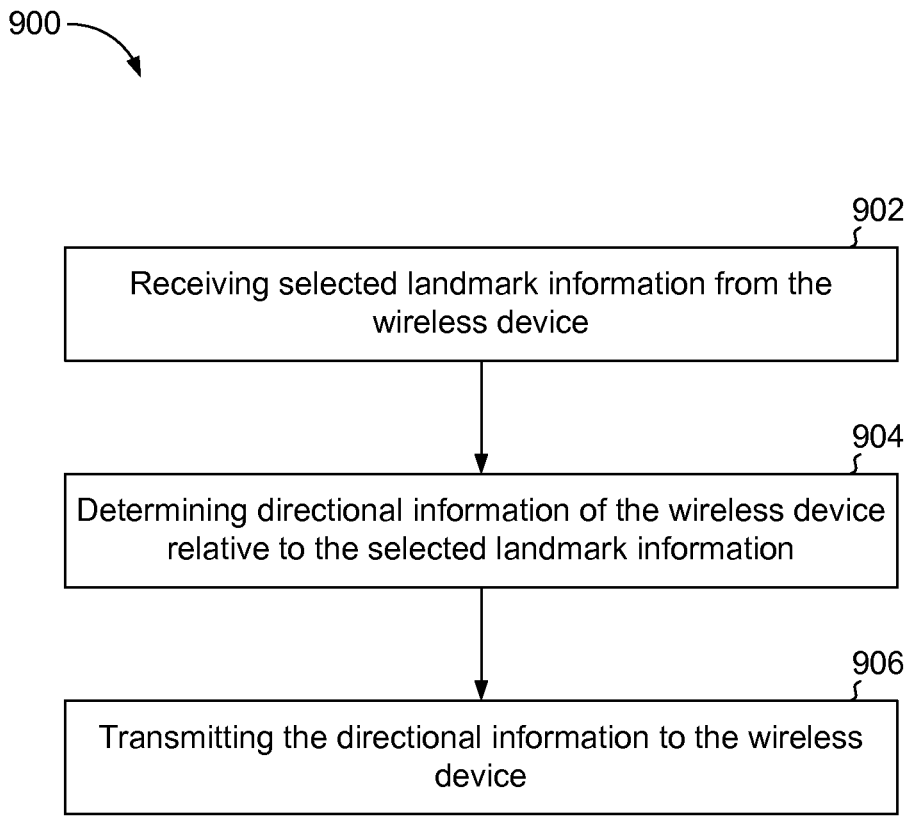
FIG. 9 is a flow chart illustrating a method for transmitting directional information to a wireless device in accordance with an aspect.

Referring now to FIG. 9, a method 900 for transmitting directional information in accordance with an aspect may include, at 902, receiving selected landmark information from the wireless device. For example, receiving component 34 (FIG. 1) may receive the selected landmark information from the wireless device.

The method may also include, at 904, determining directional information of the wireless device relative to the selected landmark information. Directional information may include, but is not limited to, directional information (e.g., north, south, east, and west) and/or the distance (e.g., 50 m) of the wireless device from the landmark. In an aspect, directional information component 36 (FIG. 1) may obtain directional information of wireless device 102 (FIG. 1) relative to the selected landmark information.

At 906, the method may further include transmitting the directional information to the wireless device. For example, sending component 44 (FIG. 1) may transmit the obtained directional information to wireless device 102.

Figure 10:
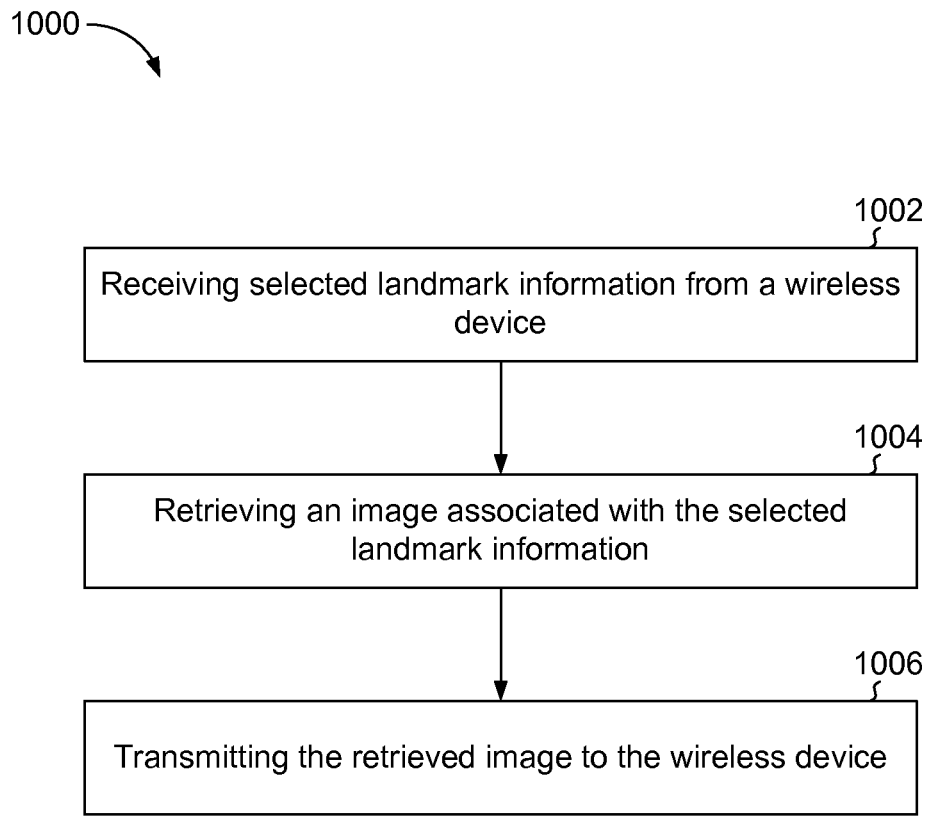
FIG. 10 is a flow chart illustrating a method for transmitting images to a wireless device in accordance with an aspect.

Referring now to FIG. 10, a method 1000 for transmitting images to a wireless device in accordance with an aspect includes, at 1002, receiving selected landmark information from a wireless device. For example, receiving component 34 (FIG. 1) may receive the selected landmark information from wireless device 102 (FIG. 1).

At 1004, the method may also include retrieving an image associated with the selected landmark information. In an aspect, landmark obtaining component 38 (FIG. 1) may obtain images of the landmark information from one or more image repositories.

In addition, at 1006, the method may include transmitting the retrieved image to the wireless device. For example, sending component 44 (FIG. 1) may transmit the obtained images to wireless device 102.

Figure 11:
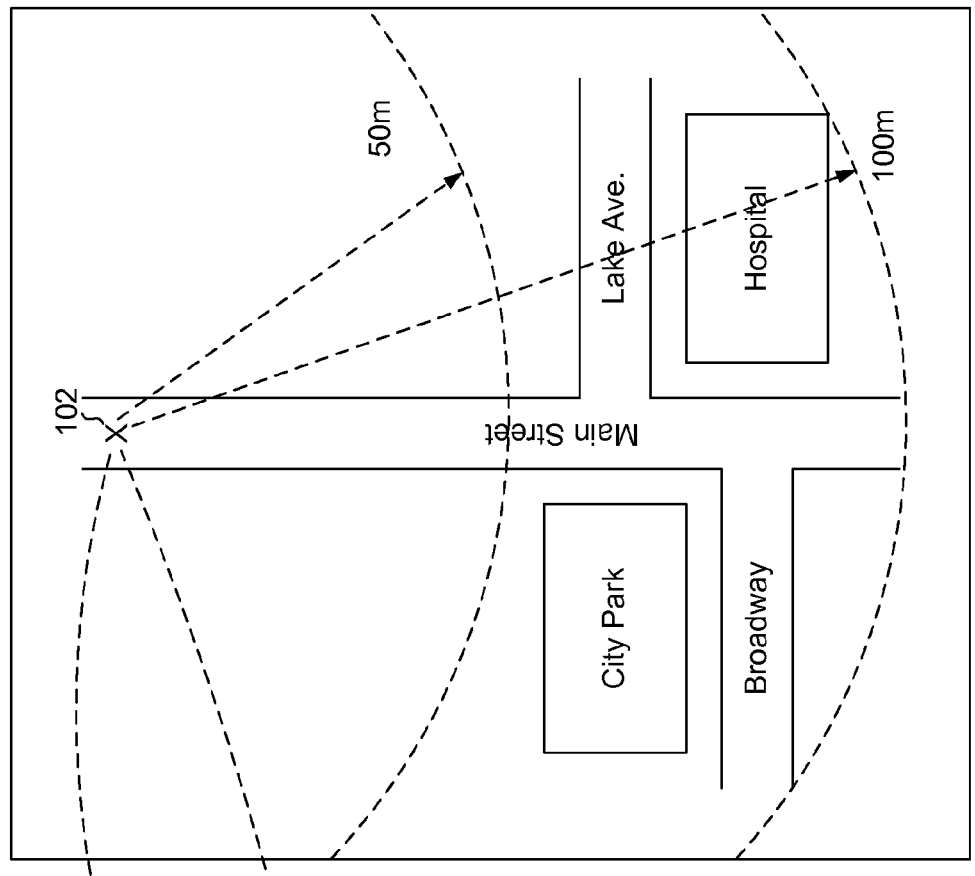
FIG. 11 illustrates an example interface in accordance with an aspect.
Figure 11:
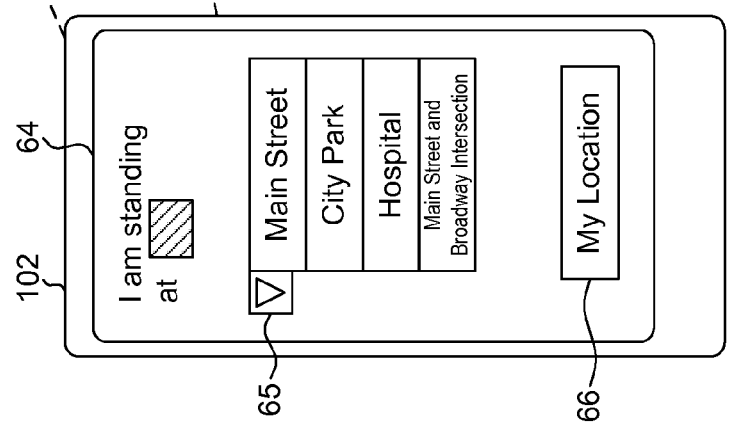

Referring now to FIG. 11, illustrated is an example interface 64 for composing a message on wireless device 102 and receiving a list 65 of landmark information near the location of wireless device 102 in accordance with an aspect. For example, wireless device 102 may obtain the current location of wireless device 102 upon a user selecting a "my location" button 66 on interface 64. In another example, wireless device 102 may obtain the current location of wireless device 102 upon inferring a location-related context based upon at least a sequence of characters inputted via interface 64 (e.g., "I am standing at").

Wireless device 102 may receive a list 65 of landmark information corresponding to the current location of wireless device 102, for example from a server. The server may initially search within 50 m of wireless device 102 for landmarks near the current location of wireless device 102. In the example illustrated in FIG. 11, the server may determine that Main Street may be the only landmark within 50 m of wireless device 102. As such, the server may extend the range of search to 100 m. The server may determine that the following landmarks are within 100 m of wireless device 102: City Park, Intersection of Main Street and Broadway Street, and the Hospital.

The server may transmit to wireless device 102 the list 65 of landmark information corresponding to the current location of wireless device 102 (e.g., Main Street, City Park, Hospital, and Intersection of Main Street and Broadway Street). Wireless device 102 may receive the list 65 of landmark information and may present the list of landmark information on interface 64. It should be noted that the list of landmark information may be ordered based upon the distance of wireless device 102 from the landmark. A user of wireless device 102 may select one or more of the received landmark information presented in the list on interface 64 to include, for example, in a message, such as an e-mail, SMS message, etc.

Figure 12:
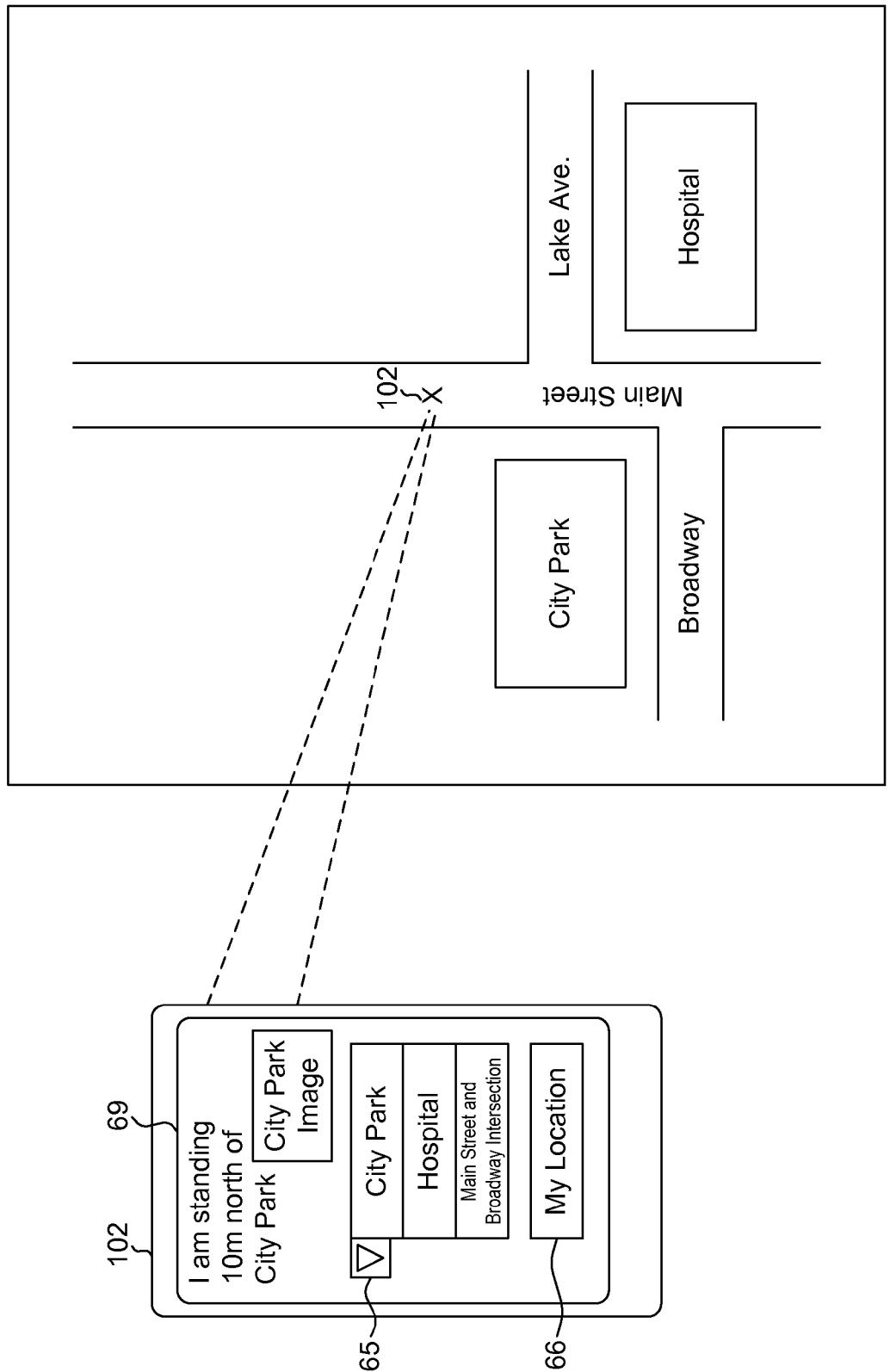
FIG. 12 illustrates an example interface in accordance with another aspect.

Referring now to FIG. 12, illustrated is an example interface 69 for composing a message on wireless device 102 and receiving a list 65 of landmark information near the location of wireless device 102 in accordance with an aspect. For example, wireless device 102 may obtain the current location of wireless device 102 upon a user selecting a "my location" button 66 on interface 69. In another example, wireless device 102 may obtain the current location of wireless device 102 upon inferring a location-related context based upon at least a sequence of characters inputted via interface 69 (e.g., "I am standing at").

Wireless device 102 may receive a list 65 of landmark information (e.g., City Park, Hospital, and Intersection of Main Street and Broadway Street) corresponding to the current location of wireless device 102 and may present the list 65 of landmark information on interface 69. Upon a user selecting a landmark from the list 65 of landmark information, wireless device 102 may receive directional information of the wireless device 102 relative to the selected landmark. For example, if the user selects "City Park" as the landmark, the directional information may be "10 meters north." In addition, wireless device 102 may also receive an image of the selected landmark. The selected landmark, the directional information and the image may be included, for example, in a message, such as an e-mail, SMS message, etc. on interface 69.

Figure 13:
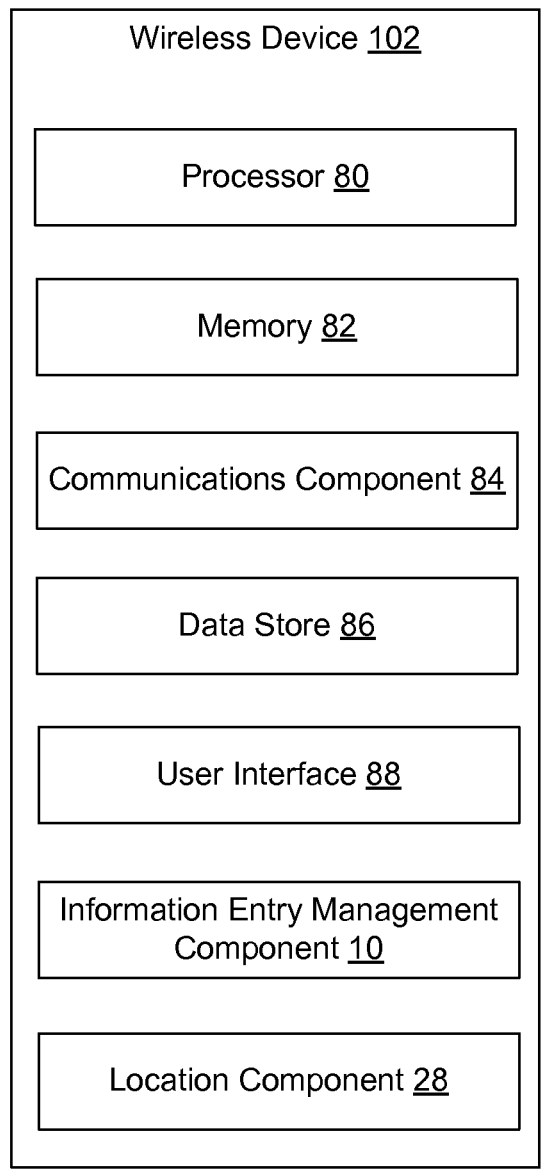
FIG. 13 illustrates an example wireless device operable within the connectivity system in accordance with an aspect.

Referring now to FIG. 13, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include an information entry management component 10 (FIG. 1) operable for managing information entry on wireless device 102. In addition, wireless device 102 may include a location component 28 operable to obtain a current location of wireless device 102. In an aspect, user interface component 88 may transmit and/or receive messages corresponding to the operation of information entry management component 10 and/or location component 28. In addition, processor 80 executes information entry management component 10 and location component 28, and memory 82 or data store 86 may store them.

Figure 14:
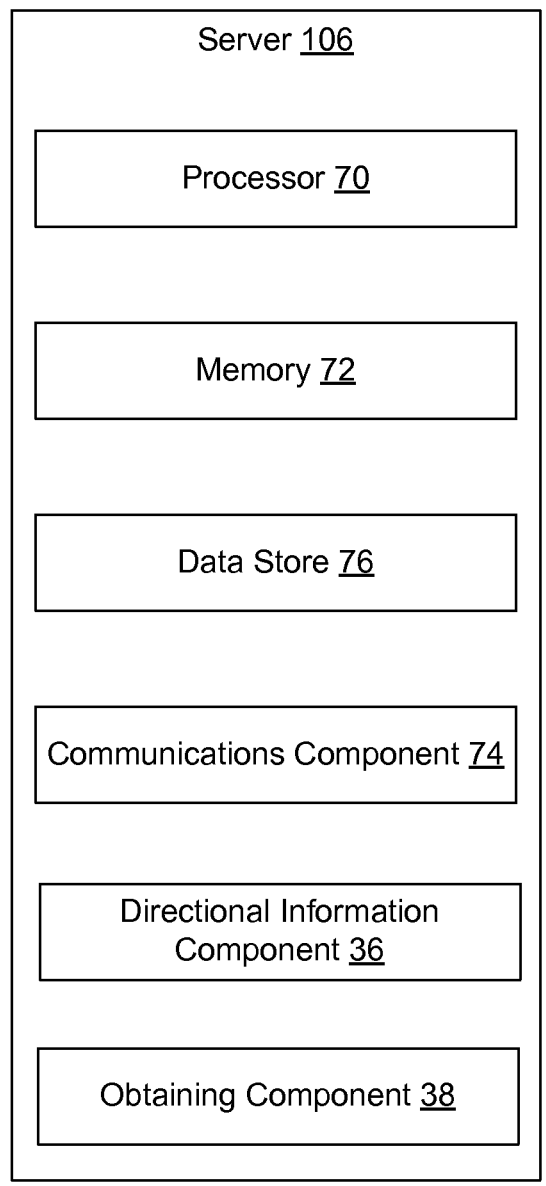
FIG. 14 illustrates an example server operable within the connectivity system in accordance with an aspect.

Referring now to FIG. 14, illustrated is an example sever device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Server 106 may also include a directional information component 36 (FIG. 1) operable for determining directional information of a wireless device relative to selected landmark information. Server 106 may also include a landmark obtaining component 38 (FIG. 1) operable to obtain landmark information, directional information, and images of landmark information. In an aspect, communications component 74 may transmit and/or receive messages corresponding to the operation of directional information component 36 and/or landmark obtaining component 38. In addition, processor 70 may execute directional information component 36 and/or landmark obtaining component 38, and memory 72 may store them.

Figure 15:
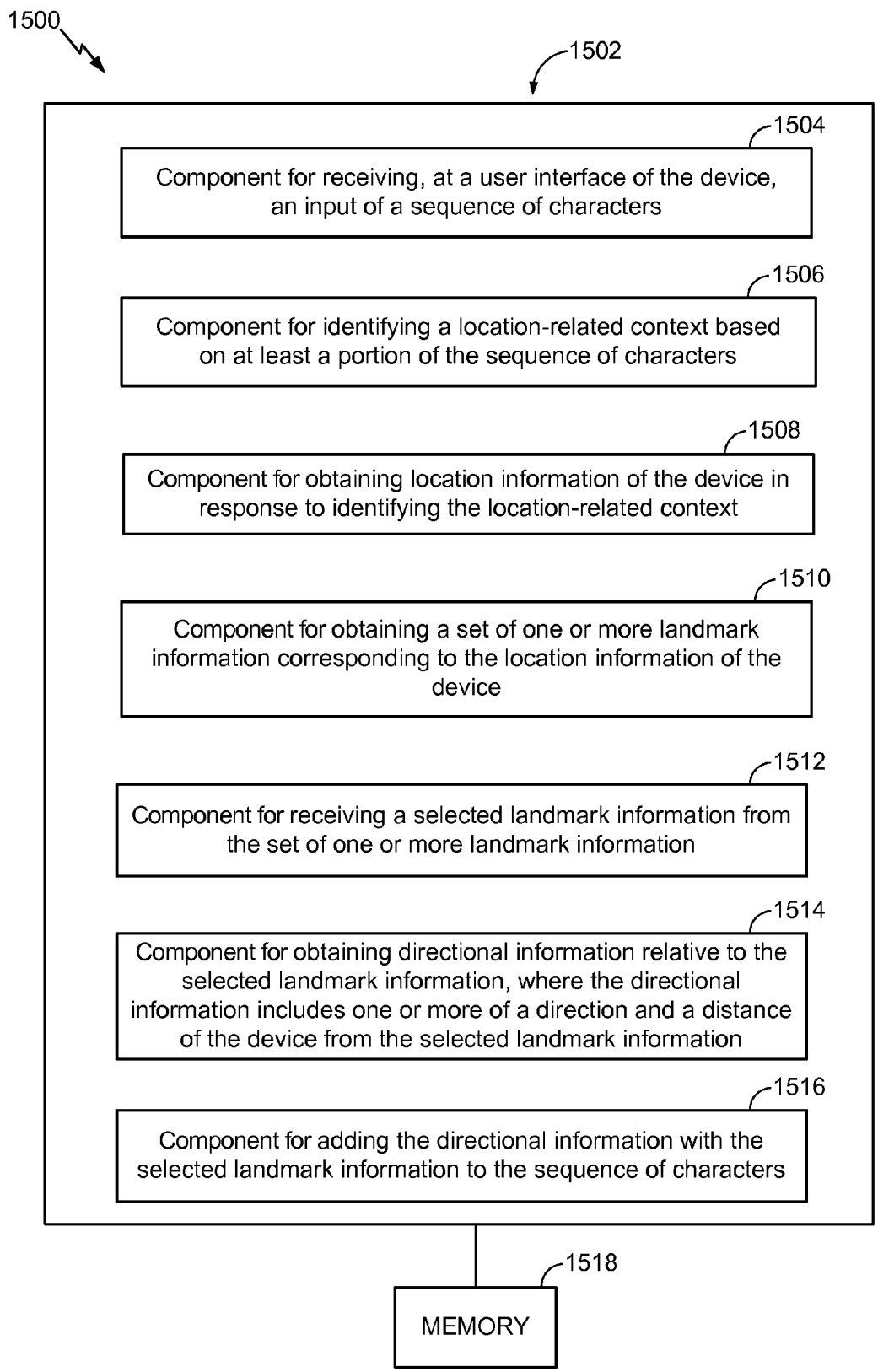
FIG. 15 illustrates an example system that facilitates automated information entry in accordance with an aspect.

Referring now to FIG. 15, illustrated is a system 1500 configured for automated information entry. For example, system 1500 can reside at least partially within a transmitter, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that facilitate automated information entry. For instance, logical grouping 1502 may include component 1504 for receiving, at a user interface of the wireless device, an input of a sequence of characters. Further, logical grouping 1502 may comprise component 1506 for identifying a location-related context based on at least a portion of the sequence of characters. In addition, logical grouping 1502 may include component 1508 for obtaining location information of the wireless device in response to identifying the location-related context. Logical grouping 1502 may also include component 1510 for obtaining a set of one or more landmark information corresponding to the location information of the wireless device. Logical grouping 1502 may further include component 1512 for receiving a selected landmark information from the set of one or more landmark information. Moreover, logical grouping 1502 may include component 1514 for obtaining directional information relative to the selected landmark information, wherein the directional information includes one or more of a direction and a distance of the wireless device from the selected landmark information. Logical grouping 1502 may also include component 1516 for adding the directional information with the selected landmark information to the sequence of characters. Additionally, system 1500 can include a memory 1518 that retains instructions for executing functions associated with electrical components 1504, 1506, 1508, 1510, 1512, 1514, and 1516. While shown as being external to memory 1518, it is to be understood that one or more of electrical components 1504, 1506, 1508, 1510, 1512, 1514, and 1516 can exist within memory 1518.

Figure 16:
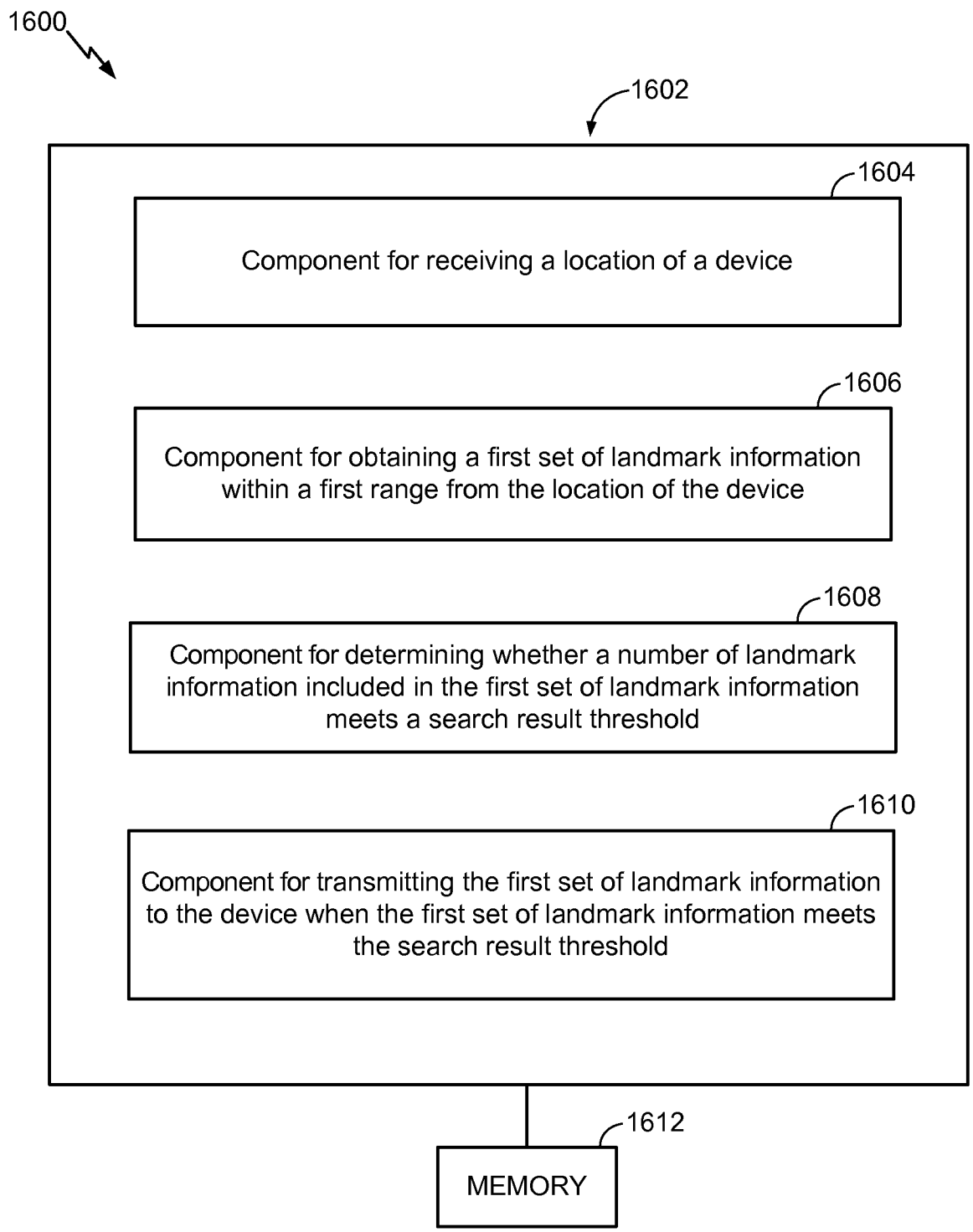
FIG. 16 illustrates an example system that facilitates transmitting location information to a wireless device in accordance with an aspect.

Referring now to FIG. 16, illustrated is a system 1600 configured to transmit location information. For example, system 1600 can reside at least partially within a transmitter, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that facilitate transmitting location information. For instance, logical grouping 1602 may include component 1604 for receiving a location of a wireless device. Further, logical grouping 1602 may comprise component 1606 for obtaining a first set of landmark information within a first range from the location of the wireless device. In addition, logical grouping 1602 may include component 1608 for determining whether a number of landmark information included in the first set of landmark information meets a search result threshold. Logical grouping 1602 may also include component 1610 for transmitting the first set of landmark information to the wireless device when the first set of landmark information meets the search result threshold. Additionally, system 1600 can include a memory 1612 that retains instructions for executing functions associated with electrical components 1604, 1606, 1608, and 1610. While shown as being external to memory 1612, it is to be understood that one or more of electrical components 1604, 1606, 1608, and 1610 can exist within memory 1612.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of automated information entry in a wireless device, comprising:
   receiving, at a user interface of the wireless device, an input of a sequence of characters;
   identifying a location-related context based on at least a portion of the sequence of characters;
   obtaining location information of the wireless device in response to identifying the location-related context;
   obtaining a first set of landmark information within a first range of the location information of the wireless device;

determining whether a number of search results for the obtained first set of landmark information meets a search result threshold;

receiving selected landmark information from the first set of landmark information in response to a determination that the number of search results meets the search result threshold;

obtaining directional information relative to the selected landmark information, wherein the directional information includes one or more of a direction or a distance of the wireless device from the selected landmark information; and adding the directional information with the selected landmark information to the sequence of characters.

2. The method of claim 1, further comprising:
obtaining an image representing the selected landmark information; and
presenting the image with the sequence of characters.

3. The method of claim 1, wherein identifying the location-related context further comprises detecting a match between a location-inferring word and at least the portion of the sequence of characters.

4. The method of claim 3, wherein the location-inferring word is selected from a group consisting of "in", "at", "on", "visiting", "heading", "going", "by", "near", "from", "next to", "in front of", "beside", "beneath", and "on top of".

5. The method of claim 1, further comprising:
obtaining a second set of landmark information within a second range from the location information of the wireless device in response to a determination that the first set of landmark information does not meet the search result threshold.

6. The method of claim 5, wherein the first range is less than the second range.

7. The method of claim 1, further comprising:
presenting the first set of landmark information in a list.

8. The method of claim 7, wherein the first set of landmark information may be ordered.

9. The method of claim 1, further comprising:
storing the first set of landmark information corresponding to the location information in a cache on the wireless device.

10. The method of claim 9, further comprising:
obtaining the first set of landmark information from the cache when the wireless device returns to a location.

11. The method of claim 9, further comprising:
receiving a customized name for the selected landmark information; and
storing the customized name corresponding to the selected landmark information in the cache.

12. The method of claim 9, wherein the cache further comprises a message dictionary; and
adding the selected landmark information to the message dictionary.

13. The method of claim 12, wherein adding the selected landmark information to the sequence of characters further comprises automatically adding the selected landmark information from the message dictionary.

14. The method claim 1, wherein the landmark information comprises one or more of a name of a landmark, a structure, a building, a street, an address, an intersection, a graphic representing a location, or an icon representing a location.

15. The method of claim 1, wherein the location information is obtained from a global positioning system (GPS) component on the wireless device or a last fix of the wireless device.

16. The method of claim 15, wherein the location information is obtained upon receiving a selection of a location button on the wireless device.

17. At least one processor configured for automated information entry in a wireless device, comprising:
a first module for receiving, at a user interface of the wireless device, an input of a sequence of characters;
a second module for identifying a location-related context based on at least a portion of the sequence of characters;
a third module for obtaining location information of the wireless device in response to identifying the location-related context;
a fourth module for obtaining a first set of landmark information within a first range of the location information of the wireless device;
a fifth module for determining whether a number of search results for the obtained first set of landmark information meets a search result threshold;
a sixth module for receiving selected landmark information from the first set of landmark information in response to a determination that the number of search results meets the search result threshold;
a seventh module for obtaining directional information relative to the selected landmark information, wherein the directional information includes one or more of a direction or a distance of the wireless device from the selected landmark information; and
an eighth module for adding the directional information with the selected landmark information to the sequence of characters.

18. A computer program product, comprising:
a non-transitory computer-readable medium comprising:
at least one instruction for causing a computer to receive, at a user interface of a wireless device, an input of a sequence of characters;
at least one instruction for causing the computer to identify a location-related context based on at least a portion of the sequence of characters;
at least one instruction for causing the computer to obtain location information of the wireless device in response to identifying the location-related context;
at least one instruction for causing the computer to obtain a first set of landmark information within a first range of the location information of the wireless device;
at least one instruction for causing the computer to determine whether a number of search results for the obtained first set of landmark information meets a search result threshold;
at least one instruction for causing the computer to receive selected landmark information from the first set of landmark information in response to a determination that the number of search results meets the search result threshold;
at least one instruction for causing the computer to obtain directional information relative to the selected landmark information, wherein the directional information includes one or more of a direction or a distance of the wireless device from the selected landmark information; and
at least one instruction for causing the computer to add the directional information with the selected landmark information to the sequence of characters.

19. An apparatus, comprising:
means for receiving, at a user interface of a wireless device, an input of a sequence of characters;

means for identifying a location-related context based on at least a portion of the sequence of characters;
means for obtaining location information of the wireless device in response to identifying the location-related context;
means for obtaining a first set of landmark information within a first range of the location information of the wireless device;
means for determining whether a number of search results for the obtained first set of landmark information meets a search result threshold;
means for receiving selected landmark information from the first set of landmark information in response to a determination that the number of search results meets the search result threshold;
means for obtaining directional information relative to the selected landmark information, wherein the directional information includes one or more of a direction or a distance of the wireless device from the selected landmark information; and
means for adding the directional information with the selected landmark information to the sequence of characters.

20. An apparatus, comprising:
an input component operable to receive, at a user interface of a wireless device, an input of a sequence of characters;
a location-related component operable to identify a location-related context based on at least a portion of the sequence of characters;
a location component operable to obtain location information of the wireless device in response to identifying the location-related context;
a receiving component operable to obtain a first set of landmark information within a first range of the location information of the wireless device;
a determining component operable to determine whether a number of search results for the obtained first set of landmark information meets a search result threshold;
a selection component operable to receive selected landmark information from the first set of landmark information in response to a determination that the number of search results meets the search result threshold;
the receiving component being further operable to obtain directional information relative to the selected landmark information, wherein the directional information includes one or more of a direction or a distance of the wireless device from the selected landmark information; and
a presenting component operable to add the directional information with the selected landmark information to the sequence of characters.

21. The apparatus of claim 20, wherein the receiving component is further operable to obtain an image representing the selected landmark information; and
wherein the presenting component is further operable to present the image with the sequence of characters.

22. The apparatus of claim 20, wherein the location-related component is further operable to identify the location-related context by detecting a match between a location-inferring word and at least the portion of the sequence of characters.

23. The apparatus of claim 22, wherein the location-inferring word is selected from a group consisting of "in", "at", "on", "visiting", "heading", "going", "by", "near", "from", "next to", "in front of", "beside", "beneath", and "on top of".

24. The apparatus of claim 20, wherein the receiving component is further operable to obtain a second set of landmark information within a second range from the location information of the wireless device in response to a determination that the first set of landmark information does not meet the search result threshold.

25. The apparatus of claim 24, wherein the first range is less than the second range.

26. The apparatus of claim 20, wherein the presenting component is further operable to present the first set of landmark information in a list.

27. The apparatus of claim 26, wherein the first set of landmark information may be ordered.

28. The apparatus of claim 20, further comprising:
a cache operable to store the first set of landmark information corresponding to the location information in the cache on the wireless device.

29. The apparatus of claim 28, wherein the receiving component is further operable to obtain the first set of landmark information from the cache when the wireless device returns to a location.

30. The apparatus of claim 28, wherein the cache is further operable to receive and store a customized name for the selected landmark information.

31. The apparatus of claim 28, wherein the cache further comprises a message dictionary and adds the selected landmark information to the message dictionary.

32. The apparatus of claim 31, wherein the presenting component is further operable to automatically add the selected landmark information from the message dictionary to the sequence of characters.

33. The apparatus claim 20, wherein the landmark information comprises one or more of a name of a landmark, a structure, a building, a street, an address, an intersection, a graphic representing a location, or an icon representing a location.

34. The apparatus of claim 20, wherein the location component is further operable to obtain the location information from a global positioning system (GPS) component on the wireless device or a last fix of the wireless device.

35. The apparatus of claim 34, wherein the location component is further operable to obtain the location information upon receiving a selection of a location button on the wireless device.

36. A method for transmitting location information, comprising:
receiving a location of a wireless device;
obtaining a first set of landmark information within a first range from the location of the wireless device;
determining whether a number of search results for the obtained first set of landmark information meets a search result threshold;
transmitting the first set of landmark information to the wireless device in response to a determination that the first set of landmark information meets the search result threshold;
receiving a selection of landmark information from the wireless device;
obtaining directional information of the wireless device relative to the selected landmark information; and
transmitting the directional information to the wireless device.

37. The method of claim 36, further comprising:
obtaining a second set of landmark information within a second range from the location of the wireless device in response to a determination that the first set of landmark information does not meet the search result threshold; and transmitting the first set of landmark information and the second set of landmark information to the wireless device.

38. The method of claim 36, wherein the first range is less than the second range.

39. The method of claim 36, further comprising:
retrieving an image associated with the selected landmark information; and
transmitting the retrieved image to the wireless device.

40. The method of claim 36, wherein the directional information includes one or more of a direction or a distance of the wireless device from the selected landmark information.

41. The method of claim 36, wherein the landmark information comprises one or more of a name of a landmark, a structure, a building, a street, an address, an intersection, a graphic representing the location, or an icon representing the location.

42. At least one processor configured for transmitting location information, comprising:
a first module for receiving a location of a wireless device;
a second module for obtaining a first set of landmark information within a first range from the location of the wireless device;
a third module for determining whether a number of search results for the obtained first set of landmark information meets a search result threshold;
a fourth module for transmitting the first set of landmark information to the wireless device in response to a determination that the first set of landmark information meets the search result threshold;
a fifth module for receiving a selection of landmark information from the wireless device;
a sixth module for obtaining directional information of the wireless device relative to the selected landmark information; and
a seventh module for transmitting the directional information to the wireless device.

43. A computer program product, comprising:
a non-transitory computer-readable medium comprising:
at least one instruction for causing a computer to receive a location of a wireless device;
at least one instruction for causing the computer to obtain a first set of landmark information within a first range from the location of the wireless device;
at least one instruction for causing the computer to determine whether a number of search results for the obtained first set of landmark information meets a search result threshold; and
at least one instruction for causing the computer to transmit the first set of landmark information to the wireless device in response to a determination that the first set of landmark information meets the search result threshold;
at least one instruction for causing the computer to receive a selection of landmark information from the wireless device;
at least one instruction for causing the computer to obtain directional information of the wireless device relative to the selected landmark information; and
at least one instruction for causing the computer to transmit the directional information to the wireless device.

44. An apparatus, comprising:
means for receiving a location of a wireless device;
means for obtaining a first set of landmark information within a first range from the location of the wireless device;
means for determining whether a number search results for the obtained first set of landmark information meets a search result threshold; and
means for transmitting the first set of landmark information to the wireless device in response to a determination that the first set of landmark information meets the search result threshold;
means for receiving a selection of landmark information from the wireless device;
means for obtaining directional information of the wireless device relative to the selected landmark information; and
means for transmitting the directional information to the wireless device.

45. An apparatus for transmitting location information, comprising:
a receiving component operable to receive a location of a wireless device;
a landmark obtaining component operable to obtain a first set of landmark information within a first range from the location of the wireless device;
a determining component operable to determine whether a number of search results for the obtained first set of landmark information meets a search result threshold; and
a sending component operable to transmit the first set of landmark information to the wireless device in response to a determination that the first set of landmark information meets the search result threshold; wherein:
the receiving component is further operable to receive a selection of landmark information from the wireless device;
the landmark obtaining component is further operable to obtain directional information of the wireless device relative to the selected landmark information; and
the sending component is further operable to transmit the directional information to the wireless device.

46. The apparatus of claim 45, wherein the landmark obtaining component is further operable to obtain a second set of landmark information within a second range from the location information of the wireless device when the first set of landmark information does not meet the search result threshold; and
wherein the sending component is further operable to transmit the first set of landmark information and the second set of landmark information to the wireless device.

47. The apparatus of claim 45, wherein the first range is less than the second range.

48. The apparatus of claim 45, wherein:
the landmark obtaining component is further operable to retrieve an image associated with the selected landmark information; and
the sending component is further operable to transmit the retrieved image to the wireless device.

49. The apparatus of claim 45, wherein the directional information includes one or more of a direction or a distance of the wireless device from the selected landmark information.

50. The apparatus of claim 45, wherein the landmark information comprises one or more of a name of a landmark, a structure, a building, a street, an address, an intersection, a graphic representing the location, or an icon representing the location.

* * * * *